United States Patent [19]
Harato et al.

[11] Patent Number: 5,302,368
[45] Date of Patent: Apr. 12, 1994

[54] PROCESS FOR PREPARATION OF ALUMINA

[75] Inventors: Takuo Harato, Tokyo; Toshiki Furubayashi, Niihama; Toshio Ashitani, Niihama; Toru Ogawa, Niihama, all of Japan

[73] Assignee: Sumitomo Chemical Company, Limited, Osaka, Japan

[21] Appl. No.: 705,620

[22] Filed: May 28, 1991

Related U.S. Application Data

[63] Continuation-in-part of Ser. No. 147,872, Jan. 25, 1988, abandoned.

[30] Foreign Application Priority Data

Jan. 29, 1987 [JP] Japan ................................. 62-19126
Jan. 29, 1987 [JP] Japan ................................. 62-19127

[51] Int. Cl.$^5$ ............................ C01F 7/20; C01F 7/22
[52] U.S. Cl. ..................................... 423/625; 423/111; 423/626; 423/628; 423/629; 423/631; 501/127; 501/153
[58] Field of Search ............... 423/625, 626, 628, 629, 423/631, 111; 501/153, 119, 127

[56] References Cited

U.S. PATENT DOCUMENTS

| | | | |
|---|---|---|---|
| 3,476,613 | 11/1969 | Gatti | 423/625 |
| 3,802,893 | 4/1974 | Kiger et al. | 501/119 |
| 3,950,478 | 4/1976 | Kenworthy | 264/234 |
| 3,975,231 | 8/1976 | Ziegenhain et al. | 423/625 |
| 4,186,178 | 1/1980 | Oberlander | 423/265 |
| 4,320,074 | 3/1982 | Birchall et al. | 264/8 |
| 4,477,427 | 10/1984 | Matyasi et al. | 423/628 |
| 4,562,059 | 12/1985 | Asaoka et al. | 423/626 |
| 4,615,875 | 10/1986 | Gonczy et al. | 423/626 |

FOREIGN PATENT DOCUMENTS 1207360 6/1962 Fed. Rep. of Germany.

OTHER PUBLICATIONS

Aluminum Laboratories, Ltd.

Primary Examiner—David Brunsman
Attorney, Agent, or Firm—Stevens, Davis, Miller & Mosher

[57] ABSTRACT

An aqueous slurry of about 100–1000 centipoises viscosity suspending about 200–2000 g/l of aluminum hydroxide particles smaller than 5 μm is spray-dried, and the dried powders are calcined to obtain alumina powders. The alumina powders have a sharp particle size distribution, being suitable for electronic, abrasive and refractory applications.

5 Claims, 8 Drawing Sheets

PARTICLE SIZE DISTRIBUTION
OF ALUMINUM HYDROXIDE

PARTICLE SIZE DISTRIBUTION OF ALUMINUM HYDROXIDE

2μ x 5000

PARTICLE SIZE DISTRIBUTION OF ALUMINA

F I G. 4
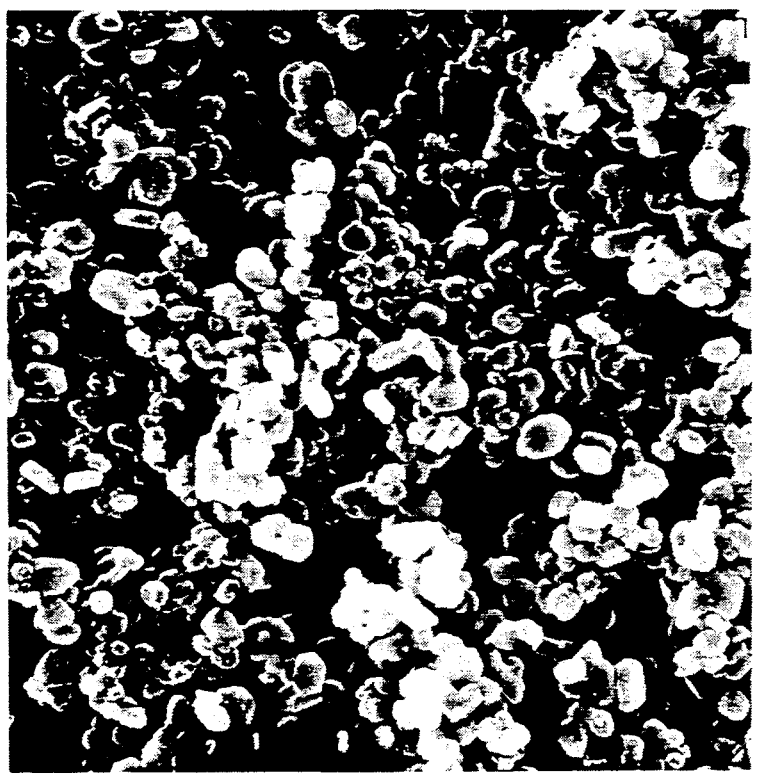
2μ x5000

F I G. 5
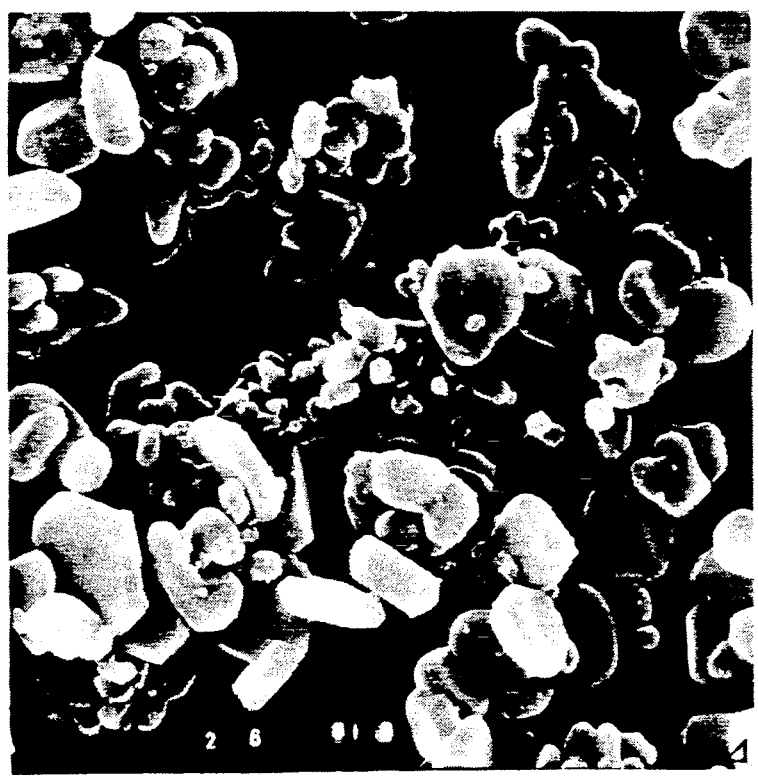
2μ x 5000

F I G. 6
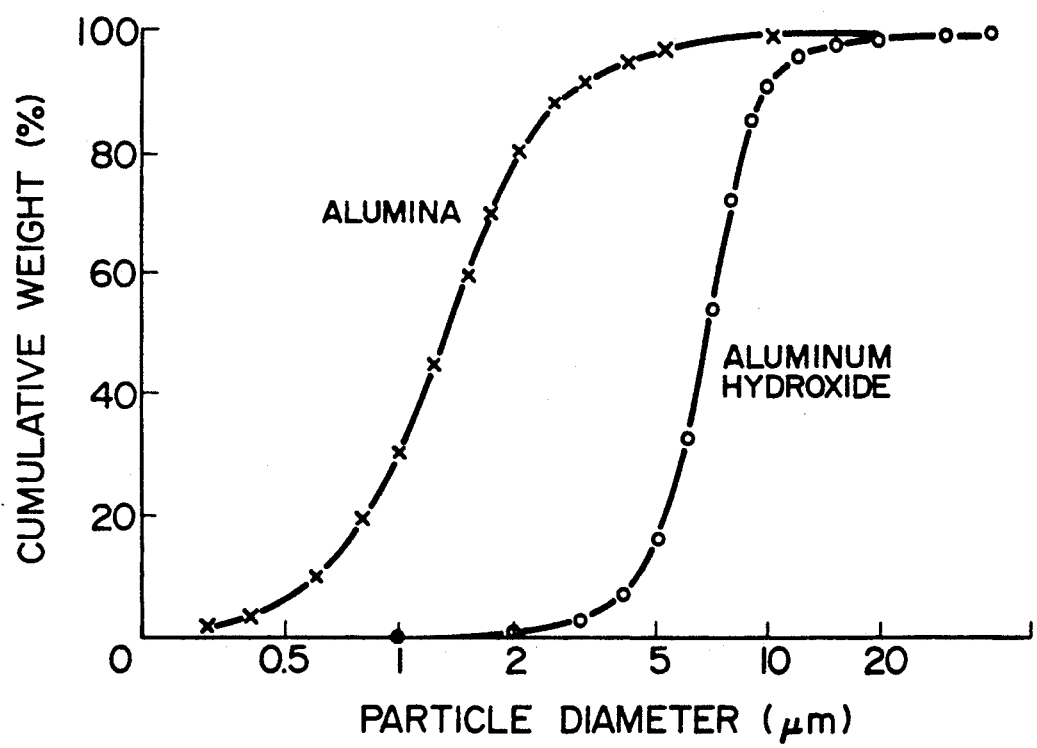
PARTICLE SIZE DISTRIBUTIONS OF
ALUMINUM HYDROXIDE AND ALUMINA

PROCESS FOR PREPARATION OF ALUMINA

This application is a continuation-in-part of application Ser. No. 07/147,872, filed Jan. 25, 1988, now abandoned the disclosure of which is incorporated herein by reference.

The present invention relates to a process for preparing alumina powders having sharp particle size distributions.

Alumina powders are in use as raw materials for various ceramic articles, abrasives, special refractories, and others. In recent years, technical progress in fields of ceramics for use as electronic components such as IC substrates has advanced remarkably and the development has been accompanied by more severe requirements in the quality of alumina powders used as raw materials for electronic components.

Improvements in the properties of alumina powders are required, since the structural uniformity, productivity and yield of final products are greatly affected by the properties of the raw material alumina powders.

For the purpose of achieving, for example, uniform morphology and high density of sintered products, it is desirable that the activity of alumina particles be uniform. In other words, the particle size distribution of alumina should be narrow and the shape of each particle should be uniform.

When used as abrasives, alumina powders are also required to have sharp particle size distribution from the viewpoint of polishing speed and finishing with scratch-free surfaces.

Heretofore, alumina for use in ceramics has been produced for the most part by calcining aluminum hydroxide produced by the Bayer's process in rotary kilns, fluidized bed furnaces, or tunnel furnaces.

Generally, aluminum hydroxide from the Bayer's process consists of aggregate particles (secondary particles) of several to over one hundred $\mu$m resulting from agglomeration of the primary particles of sub-micron to scores $\mu$m. Alumina obtained by calcining this kind of aluminum hydroxide results in a form of strongly agglomerated particles and hence, a long time is required to disintegrate the agglomerate to proper sizes. In addition, this type of alumina does not cleave along the peripheries of the original particles but splits into miscellaneously shaped $\alpha$-alumina fragments. In consequence, the disintegrated alumina particles have a broad particle size distribution, the activities of the particles become nonuniform and high-density sintered products are difficult to obtain.

In view of such circumstances, the present inventors made intensive studies in order to prepare alumina having uniform shapes and sharp particle size distribution. As a result, it has been found that all of the above noted problems can be solved when aluminum hydroxide and/or transition alumina having specific particle sizes are dispersed in an aqueous solution, and the dispersion being adjusted to a specific viscosity is spray-dried. Based on this finding, the present invention has been accomplished.

Thus, the present invention provides a process for preparing alumina. The process comprises dispersing in an aqueous medium aluminum hydroxide and/or transition alumina to form a slurry, adjusting the resulting slurry to a viscosity of about 10 to about 1000 centipoises, spray drying the slurry, and calcining the resulting dry powders in the presence of a chlorine-containing substance at a temperature of about 1100° C. to about 1500° C. to produce an $\alpha$-alumina having a particle size distribution index, $(D_{95}-D_5)/D_{50}$, of not more than 1.5. The aluminum hydroxide and/or transition alumina each have average secondary particle diameters of up to about 5 $\mu$m and are produced by Bayer's process.

BRIEF DESCRIPTION OF THE DRAWINGS

FIGS. 1, 3, and 6 show the particle size distributions of aluminum hydroxide powders and alumina powders.

FIGS. 2, 4 and 5 show scanning electron micrographs of aluminum hydroxide powders and alumina powders.

Figure 1:
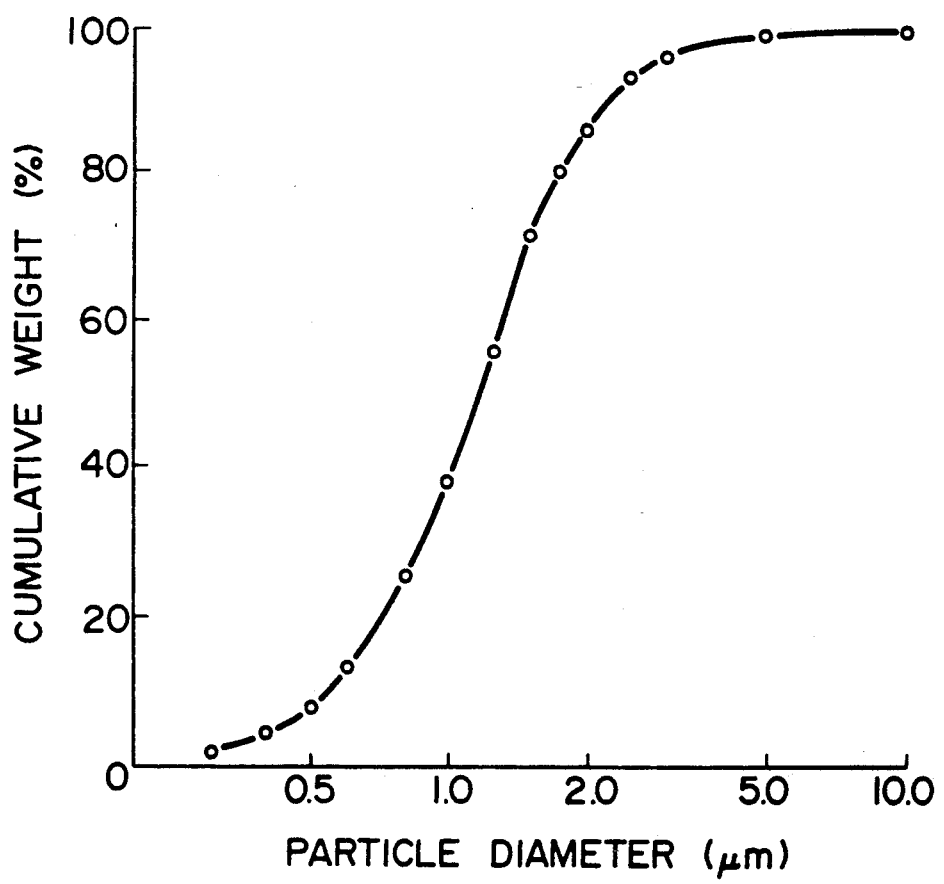

Aluminum hydroxide and/or transition alumina for the invention has average secondary-particle diameter of up to about 5 $\mu$m, preferably up to 3 $\mu$m.

There is no particular restriction on processes for producing the aluminum hydroxide and/or transition alumina, so long as the resulting average secondary-particle diameter is up to about 5 $\mu$m. However, aluminum hydroxide and/or transition alumina produced by the Bayer's process is normally used from an economical point of view.

When the average secondary-particle diameters of aluminum hydroxide and/or transition alumina are larger than 5 $\mu$m, the calcined $\alpha$-alumina therefrom has large particle sizes. Moreover, during agglomeration of the large primary particles, their crystal surfaces are liable to match with others and the particles having matched crystal surfaces tend to unite with the similar ones to grow into large $\alpha$-crystals. As the result, the alumina powders obtained have nonuniform particle sizes.

The term "transition alumina" mentioned herein is an intermediate alumina produced by drying or calcining aluminum hydroxide in the x-, k-, $\theta$-, $\rho$-, $\delta$-, or $\gamma$-crystal form prior to transferring to the $\alpha$-crystal form. Industrially, the transition alumina can be obtained, for instance, by bringing aluminum hydroxide resulting from the Bayer's process into contact with hot gases at temperatures of about 400 to about 1200° C. for a period of about 1/6 to 10 seconds, or by heating the aluminum hydroxide under reduced pressure at temperatures of about 200 to 900° C. for a period generally of 1 minute to 4 hours. The obtained transition alumina exhibits ignition loss of about 0.5 to about 15% by weight. Hereinafter, the term "aluminum hydroxide", in many cases, includes the transition alumina as well.

In the process of the invention, aluminum hydroxide is dispersed in an aqueous solution to form a slurry. Although dependent on the conditions of the subsequent spray drying, the dispersing-mixing ratio of aluminum hydroxide to the aqueous solution is generally from about 200 to about 2000 g/l, preferably from about 600 to about 1200 g/l.

Any dispersing-mixing method may be employed that permits uniform dispersion of aluminum hydroxide in the aqueous solution. For example, the dispersion can be accomplished by mechanical agitation using a stirrer or by wet mixing using a ball mill, attritor, or the like.

The viscosity of the thus obtained slurry is usually about several tens of centipoises or less depending on the dispersing agents added, which is adjusted to a viscosity of about 100 to about 1000 centipoises, preferably about 200 to about 800 centipoises, and followed by the spray drying. When the viscosity of the slurry is lower than the above specified range, the resulting alumina will have no sharp particle size distribution. On the contrary, when the viscosity is higher, uniform droplets are difficult to form in the spray drying with a result that the intended alumina powders having sharp particle size distribution cannot be obtained.

There is no particular restriction on the viscosity adjustment method, and any method may be employed that has no fear of causing marked contamination for the calcined alumina. For example, the viscosity adjustment can be accomplished by adding an aqueous ammonia; binders such as polyvinyl alcohol, methyl methacrylate, carboxymethylcellulose or methylcellulose which is often used for shaping alumina; and/or chlorides or carbonates of such a metal as Ca or Mg. However, it is recommended to use aqueous ammonia and/or a binder such as polyvinyl alcohol or the like that will be burnt up during the calcination without leaving any ash in the alumina.

In addition, a binder such as polyvinyl alcohol increases the recovery of spray-dried alumina particles in a cyclone collector or the like.

For the spray drying, any methods may be used including the rotary disk method, pressurized nozzle method, two-phase flow nozzle method and the like. Of these methods, the rotary disk method is preferred in that the resulting powders have the most narrow particle size distribution.

Particle size ranges of spray-dried powders are not particularly limited, but average particle diameters thereof are generally in the range of about 20 to about 200 $\mu$m.

The best way to achieve the intended particle size of powders depends on the types of spray dryer used. In the case of the rotary disk method, the intended particle size can be obtained by controlling the slurry concentration for spray drying, amount of slurry supplied to the disk, disk revolution, gas flow rate, and drying speed.

The spray-dried powders of aluminum hydroxide are then calcined. The calcination can be carried out by known means including methods using rotary kilns, fluidized bed furnaces, tunnel furnaces, and the like.

In the process of the invention, it is recommended to carry out the calcination in the presence of a chlorine-containing substance. There is no particular restriction on the choice of chlorine-containing substances provided that the substance evolves chlorine or hydrogen chloride during the calcination. In general, suitable chlorine-containing substances are hydrochloric acid, chlorine gas, aluminum chloride, magnesium chloride, and chlorine-containing macromolecular compounds.

The chlorine-containing macromolecular compounds include, for example, homopolymers of vinyl chloride, copolymers of vinyl chloride with unsaturated ethylenic monomers (including graft copolymers and block copolymers), homopolymers of vinylidene chloride, and copolymers of vinylidene chloride with unsaturated ethylenic monomers.

The amount of the chlorine-containing substance added to the aluminum hydroxide or transition alumina cannot be determined unanimously, since the optimum addition depends on the amount of chlorine or hydrogen chloride which the chlorine-containing substance possesses or evolves on pyrolysis. In practice, however, the chlorine-containing substance is added in an amount of generally from 0.1 to 10%, preferably from 1 to 5%, in terms of the weight of chlorine based on alumina (dry basis) present in the aluminum hydroxide or transition alumina.

When the amount of chlorine added is in the above specified range, the resulting alumina powders exhibit improved aspect ratios. When the amount exceeds 10% by weight, such a large amount of chlorine is not effective in improving the aspect ratios in proportion to the amount added, and further problems of corroding the equipment arise. Moreover, when a chlorine-containing macromolecular compound is used in such a large amount, decomposition thereof during the calcination leaves an increased amount of carbon in the alumina powders, thus lowering the purity thereof.

Suitable methods for carrying out the calcination in the presence of a chlorine-containing substance include methods of admixing the substance with the aqueous dispersion of aluminum hydroxide prior to spray drying, admixing the substance with spray-dried powder, and introducing the substance into a calcining furnace at the time of calcination to make it contact with the aluminum hydroxide or transition alumina. These methods can also be applied in their combination.

When the aluminum hydroxide or transition alumina contains soda components, chlorine-containing substances present during the calcination have naturally the effect of eliminating the soda component from the feed powder besides the above-noted effect.

However, when no chlorine-containing substance is added and another soda-eliminating agent, for example, sodium fluoride-siliceous substance mixtures, is used, the soda-eliminating effect can be achieved but it is impossible to obtain alumina particles having smaller aspect ratios.

When the soda content in the feed aluminum hydroxide is high, a siliceous substance may be added at the time of the calcination to reduce the soda content. Such siliceous substances include silica stone, quartz, silica sand, chamotte, mullite, sillimanite, magnesium silicate, aluminum silicate and the like.

The manner of using such siliceous substances varies with the type of calcining furnace employed. When a tunnel furnace is employed for calcining, saggers made of a siliceous substance are used in the furnace or 5 to 10 mm $\phi$ balls of a siliceous substance are added in the saggers.

When a rotary kiln is employed, it is best suited to add either smaller balls made of a siliceous substance or silica sand.

In these cases, the siliceous substance absorbs the soda generated during the calcination of aluminum hydroxide, thus promoting reduction of the soda content.

The amount of the siliceous substance to be added is 1% or more, preferably 5 to 10%, in terms of $SiO_2$-weight based on the alumina (dry basis).

In the process of the invention, the optimum conditions for the calcination vary with the types of furnace employed and hence cannot be determined unanimously. Suitable temperatures for the calcination are generally 1000° C. and higher, preferably in the range of 1100 to 1500° C., more preferably, about 1100 to 1400° C. Retention time at the above temperature range is from several minutes to scores of minutes in the case of a fluidized bed furnace or a flash roaster type furnace and several hours in the case of a tunnel furnace.

The retention time in relation to the calcination temperature is properly chosen according to the intended particle sizes of the product α-alumina. It is a matter of course that particle sizes of α-alumina increase with an increase in retention time and with an increase in calcination temperature.

There is no particular restriction on the type or structure of calcining furnace to be employed so long as the above calcining temperatures and retention times are secured. Known adaptable furnaces include rotary kilns, roller hearth kilns, tunnel furnaces, pneumatic conveying furnaces, fluidized bed furnaces, flash roaster type furnaces, and electric furnaces.

The thus calcined alumina powders are cooled and served immediately or after sieving as a desired product of the invention, that is, alumina powders having a sharp particle size distribution. When the calcination is carried out in the presence of a chlorine-containing substance, the obtained alumina powders have small aspect ratios in addition to the above characteristics.

The reason why the process of the present invention provides alumina having a sharp particle size distribution is not clear, but may be reasoned as follows: According to the conventional process wherein aluminum hydroxide particles deposited from a solution are separated from the liquid by decantation, filtration, or some other methods and then dried, these particles agglomerate during the above steps, in which the crystal surfaces of neighboring primary particles match with others and cause the growth of α-crystals during calcination resulting in coarse particles having broad particle size distribution. According to the process of the present invention, a slurry containing aluminum hydroxide is prepared, then the slurry viscosity is controlled so as to prevent the agglomeration of particles, and the slurry in this state is spray-dried instantly. In this case, primary particles agglomerate to a lesser extent and the growth of α-crystals due to matching of particles during the calcination also proceeds to a lesser extent. The thus obtained alumina has uniform shapes and a sharp particle size distribution. In addition, a chlorine-containing substance present during the calcination accelerates the C-axial grain growth of the fed alumina, resulting in α-alumina powders which have small aspect ratios, uniform shapes and a sharp particle size distribution.

As described in detail hereinbefore, the product of the present process is an α-alumina powder of low soda content which has small aspect ratios and has a sharp particle size distribution. These alumina particles are fitted for various ceramic applications including unprecedented uses, such as for electronic purposes, abrasive applications, high-grade refractory applications, and so forth, thus are of great industrial value.

Thus, the main features of the present invention include the following: The raw material alumina hydroxide and the transition alumina are those produced by Bayer's process. The alumina to be produced is an α-alumina powder having a sharp particle size distribution as defined by a particle size distribution index, $(D_{95}-D_5)/D_{50}$, of not more than 1.5, requiring the calcination to be in the presence of chlorine-containing substances. The dried powder produced by spray-drying requires a calcination at a temperature of not higher than 1500° C. and does not require firing at over 1500° C., as required for conventional ceramic preparations.

The present invention is illustrated in more detail with reference to the following examples. However, these examples are intended to show merely embodiments of the present inventive process and not to be construed to limit the scope of the invention.

In the examples and comparative examples, measurements were made in terms of $Na_2O$ concentrations in alumina powders obtained, particle sizes thereof at 5%-, 50%-, and 95%-cumulative weights, and densities of sintered samples prepared by compression-molding 3g each of those alumina powders in a 20-mm $\phi$ mold by applying hydrostatic pressure (1 ton), and sintering the pressed molding at 1600° C. for 2 hours. Results of the measurements are shown in Table 1.

In addition, certain alumina powders obtained in the examples and comparative examples were ground under definite conditions and changes in the BET specific surface areas of the ground powders brought about by the grinding period were measured to quantify the aspect ratios of the powders, since aspect ratios of fine particles having an average particle diameter of 1 μm or so can not be known quantitatively but only sensually from scanning electron micrographs of the particles. This concept is based on the experimental facts that flaky (large aspect ratios) α-alumina crystals are readily split on grinding and hence the BET specific surface area thereof increases quickly with an increase in grinding period while α-alumina crystals having small aspect ratios, on the contrary, are hard to split and hence, the BET specific surface area thereof increases gradually with an increase in grinding period.

The term "sharp particle size distribution" refers to in the present invention a particle size distribution index not more than 1.5, preferably not more than 1.4. The term "particle size distribution index" refers to a value calculated by the mathematical equation:

Distribution Index = $(D_{95}-D_5)/D_{50}$.

The terms "$D_5$", "$D_{50}$" and "$D_{95}$" refer to particle diameters at 5%, 50%, and 95%-cumulative weight (μm), respectively.

These cumulative weight data are determined with a sedigraph 5000. Before determining the data, the calcined alumina produced by the present invention is powdered in order to break the agglomerates contained thereon. Thus, when all the particles have the same size and the particle size distribution is absolutely sharp, the index is equal to zero. The broader the distribution, the greater the index becomes.

Particle sizes were measured with a sedigraph, and the viscosity of the slurry with β-type viscometer (Tokyo Keiki Co., Ltd.; No. 2 rotor; 30 rpm; room temperature).

EXAMPLE 1

Figure 2:
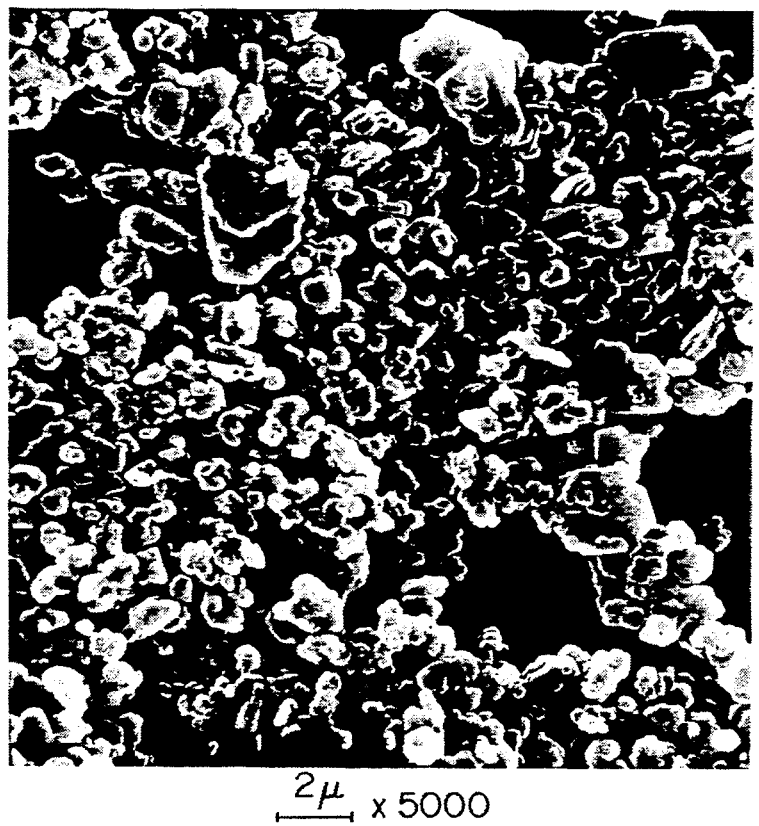

1800 g of aluminum hydroxide (C-301 ®; Sumitomo Chemical Co., Ltd.) having 0.35 wt% of soda content (as $Na_2O$) produced by the Bayer's process was dispensed in 2450 ml of water combined with 360 ml of 10% hydrochloric acid. The above aluminum hydroxide had a particle size distribution as shown in FIG. 1 and particle shapes were as shown in the scanning electron micrograph of FIG. 2. Further, 180 g of 10% aqueous solution of polyvinyl alcohol (PVA 205 ®; Kuraray Co., Ltd.) and 30 ml of 25% aqueous ammonia were added successively to the dispersion, thereby adjusting the slurry viscosity to 200 centipoises.

The thus obtained slurry was flash-dried by means of a rotating disk type spray dryer (Type MM; A/S NIRO ATOMIZER, Denmark) under conditions of slurry feed rate of 2 l/hr, slurry concentration of 677 g/l, disk revolution 10,000 r.p.m. and drying temperature of 110°

C. giving powders of 30 μm in the average particle diameter.

The powders were filled in mullite saggers and calcined in a box type electric furnace at 1300° C. for 2 hours, and then ball-milled for 24 hours, giving alumina powders.

Figure 3:
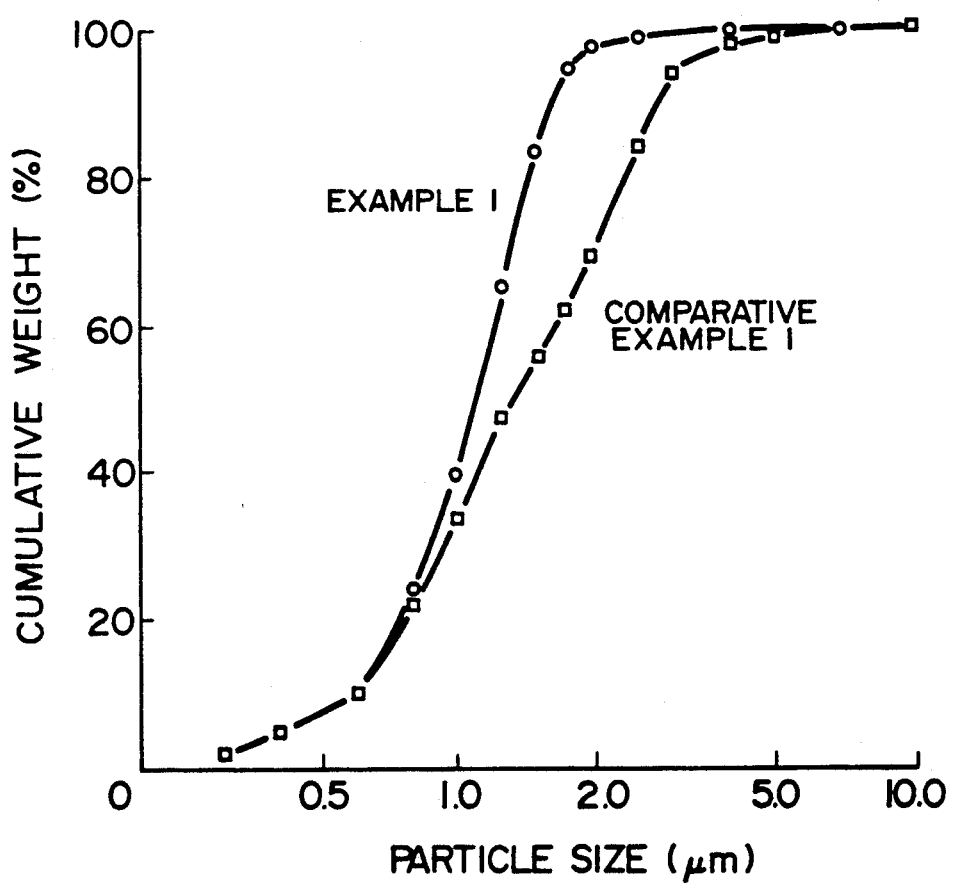

The particle size distribution of the obtained alumina powders is shown in FIG. 3 and a scanning electron micrograph of the powders is shown as FIG. 4.

COMPARATIVE EXAMPLE 1

Low-soda alumina powders were prepared according to the procedure of Example 1 by calcining aluminum hydroxide prepared without being treated for the viscosity adjustment.

The particle size distribution of the obtained alumina powders is shown in FIG. 3 and a scanning electron micrograph of the powder is shown in FIG. 5.

COMPARATIVE EXAMPLE 2

Low-soda alumina powders were prepared according to the procedure of Example 1 except that the aluminum hydroxide was replaced by one (C-308 ®, Sumitomo Chemical Co., Ltd.) having particle size distribution of 7 μm for the average secondary-particle diameter as shown in FIG. 6.

The particle size distribution of the obtained alumina powders is shown also in FIG. 6.

EXAMPLES 2 AND 3 AND COMPARATIVE EXAMPLE 3

Low-soda alumina powders were prepared according to the procedure of Example 1 except that the slurry viscosities were adjusted by adding polyvinyl alcohol and 25% aqueous ammonia in amounts shown in Table 2.

Properties of the obtained alumina powders are shown also in Table 2.

Figure 7:
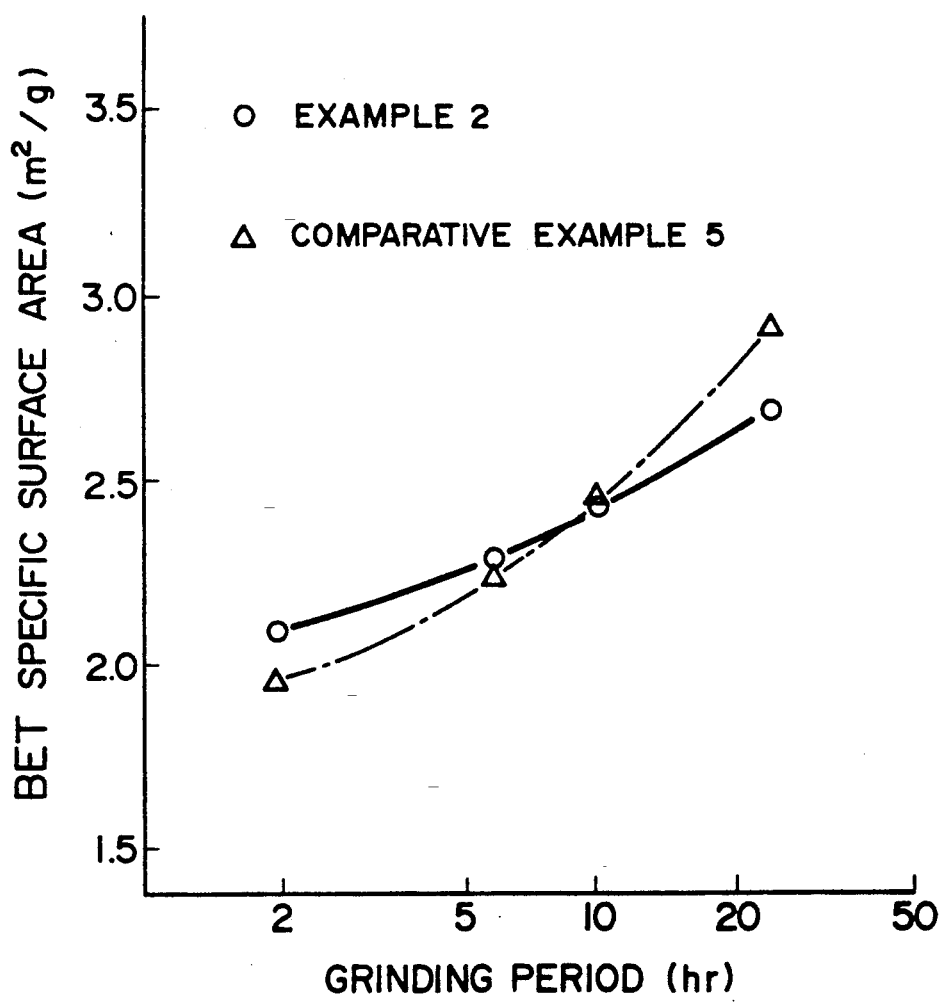
FIGS. 7 and 8 show the relationship between the BET specific surface areas of particles resulting from ball-milling of alumina powders and their ball-milling periods with respect to differences in their aspect ratios.

FIG. 7 shows the relationship between the BET specific surface area and the ball-mill grinding period for alumina powders obtained in Example 2.

COMPARATIVE EXAMPLE 4

Alumina powders were prepared according to the procedure of Example 1 employing direct calcination of the aluminum hydroxide filled in mullite saggers, in which the hydrochloric acid addition, viscosity adjustment and spray-drying were omitted.

Properties of the obtained alumina powders are shown in Table 2.

EXAMPLE 4

Alumina powders were prepared according to the procedure of Example 1 except that the calcination conditions in the box type electric furnace were changed to 1250° C. ×2 hours.

Figure 8:
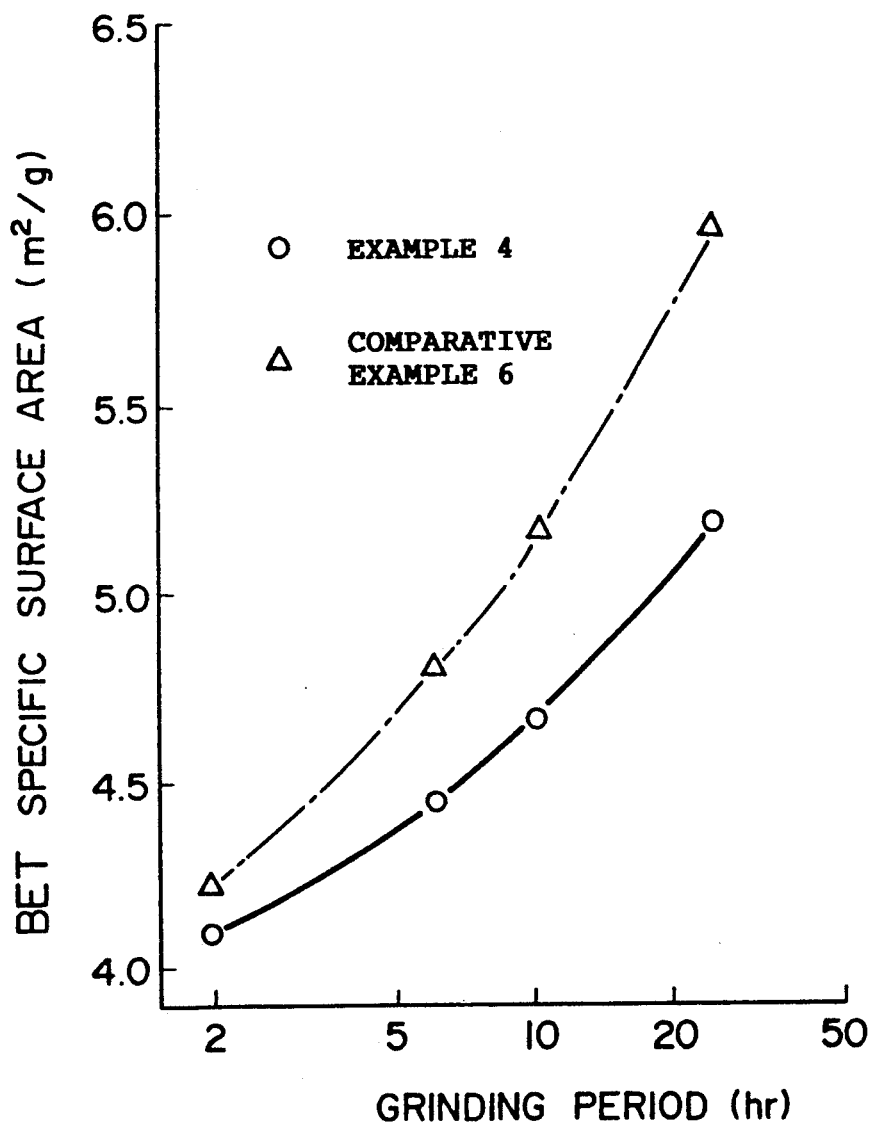

Properties of the obtained alumina powders are shown in Table 2 FIG. 8 shows the relationship between the BET specific surface area and ball-mill grinding period for the alumina powders.

EXAMPLE 5

The same aluminum hydroxide as used in Example 1 was calcined beforehand at 500° C. for 4 hours, and 1500 g of the resulting alumina was dispersed in 2450 ml of water combined with 360 ml of 10% hydrochloric acid. The resulting slurry was adjusted to the viscosity of 200 centipoises by adding 180 g of 10% aqueous solution of polyvinyl alcohol and then 45 ml of 25% aqueous ammonia. The thus obtained slurry was treated as in Example 1, giving low-soda alumina powders.

Properties of the obtained alumina powders are shown in Table 2.

COMPARATIVE EXAMPLE 5

Alumina powders were prepared according to the procedure of Example 1 except that 320 ml of 1% aqueous sodium fluoride solution was used in place of 10% hydrochloric acid for addition to the slurry.

Properties of the obtained alumina powders are shown in Table 2. FIG. 7 shows the relationship between the BET specific surface area and ball-mill grounding period of the alumina powders.

COMPARATIVE EXAMPLE 6

Alumina powders were prepared according to the procedure of Example 1 except that the hydrochloric acid was not added.

Properties of the obtained alumina powders are shown in Table 2. FIG. 8 shows the relationship between the BET specific surface area and ball-mill grinding period for the obtained alumina powders.

TABLE 1

| | $D_{50}$ | $D_5$ | $D_{95}$ | $\frac{D_{95} - D_5}{D_{50}}$ | F.D. | $Na_2O$ quantity |
|---|---|---|---|---|---|---|
| Example 1 | 1.1 | 0.4 | 1.8 | 1.27 | 3.80 | 0.02 |
| Comparative Example 1 | 1.4 | 0.4 | 3.0 | 1.86 | 3.64 | 0.02 |
| Comparative Example 2 | 1.3 | 0.4 | 3.8 | 2.62 | 3.66 | 0.03 |

Note:
D: Particle diameter (μm)
F.D.: Sintered density (g/cm$^3$)
Na$_2$O quantity: soda content (wt %) in alumina powders

TABLE 2

| | HCL (ml) | PVA (g) | NH$_3$ (ml) | Viscosity (cmp) | $D_{50}$ | $D_5$ | $D_{95}$ | $\frac{D_{95} - D_5}{D_{50}}$ | F.D. | Na$_2$O quantity |
|---|---|---|---|---|---|---|---|---|---|---|
| Example 2 | 360 | 180 | 45 | 500 | 1.3 | 0.4 | 1.7 | 1.00 | 3.84 | 0.02 |
| Example 3 | 360 | 180 | 60 | 800 | 1.2 | 0.4 | 2.0 | 1.33 | 3.81 | 0.02 |
| Example 4 | 360 | 180 | 30 | 200 | 0.6 | 0.3 | 1.1 | 1.33 | 3.92 | 0.02 |
| Example 5 | 360 | 180 | 45 | 200 | 1.2 | 0.4 | 1.7 | 1.08 | 3.86 | 0.02 |
| Comparative Example 3 | 360 | 180 | 70 | 1200* | 1.2 | 0.4 | 2.8 | 2.00 | 3.68 | 0.03 |
| Comparative Example 4 | 0 | 0 | 0 | — | 0.6 | 0.2 | 2.2 | 3.33 | 3.80 | 0.13 |
| Comparative Example 5 | ** | 180 | 35 | 200 | 1.2 | 0.4 | 2.5 | 1.75 | 3.76 | 0.06 |
| Comparative | 0 | 180 | 0 | 400 | 0.6 | 0.2 | 1.3 | 1.83 | 3.88 | 0.12 |

TABLE 2-continued

| | HCL (ml) | PVA (g) | NH₃ (ml) | Viscosity (cmp) | Property | | | | | |
|---|---|---|---|---|---|---|---|---|---|---|
| | | | | | $D_{50}$ | $D_5$ | $D_{95}$ | $\frac{D_{95}-D_5}{D_{50}}$ | F.D. | Na₂O quantity |
| Example 6 | | | | | | | | | | |

Note:
HCL: Hydrochloric acid
PVA: Polyvinyl alcohol
NH₃: 25% Aqueous ammonia
D: Particle diameter (μm)
F.D.: Sintered density (g/cm³)
Na₂O quantity: Na₂O content (wt %) in alumina powders
*The slurry adjusted to the viscosity of 1200 centipoises gave a markedly low yield of dry powders in spray-drying.
**320 ml of 1% aqueous NaF solution was used.

We claim:

1. A process for preparing an α-alumina having a particle size distribution index, $(D_{95}-D_5)/D_{50}$, of not more than 1.5, comprising:
    dispersing in an aqueous medium aluminum hydroxide having average secondary particle diameters of up to about 5 μm and produced by Bayer's process and/or transition alumina having average secondary particle diameters of up to about 5 μm and produced by Bayer's process to form a slurry;
    adjusting the viscosity, at the temperature and pressure of the resulting slurry, to viscosities of about 100 to about 1000 centiposes;
    spray-drying the slurry to obtain dry powders; and
    calcining the resulting dry powders in the presence of a chlorine-containing substance at a temperature of about 1100° C. to about 1500° C.

2. The process of claim 1, wherein the calcining of the dry powders produces α-alumina having a particle size distribution index of not more than 1.4.

3. The process of claim 1, wherein the temperature of calcining is about 1100° C. to about 1400° C.

4. The process of claim 1, wherein the viscosity adjustment is carried out by adding an aqueous ammonia and/or polyvinyl chloride.

5. The process of claim 1, wherein the chlorine-containing substance is selected from the group consisting of hydrochloric acid, chlorine gas, aluminum chloride, calcium chloride and chlorine-containing macromolecular compounds.

* * * * *